United States Patent
Makharia et al.

(10) Patent No.: US 9,930,600 B2
(45) Date of Patent: *Mar. 27, 2018

(54) PERFORMING NEIGHBORING CELL SEARCHES WHILE TRANSITIONING TO CONNECTED-MODE

(71) Applicant: Apple Inc., Cupertino, CA (US)

(72) Inventors: Shivesh Makharia, Santa Clara, CA (US); Navid Damji, Cupertino, CA (US); Longda Xing, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/841,920

(22) Filed: Sep. 1, 2015

(65) Prior Publication Data

US 2015/0373612 A1 Dec. 24, 2015

Related U.S. Application Data

(63) Continuation of application No. 13/761,746, filed on Feb. 7, 2013, now Pat. No. 9,161,267.

(60) Provisional application No. 61/680,053, filed on Aug. 6, 2012.

(51) Int. Cl.
| | |
|---|---|
| *H04W 36/00* | (2009.01) |
| *H04W 36/30* | (2009.01) |
| *H04W 48/20* | (2009.01) |
| *H04W 76/04* | (2009.01) |
| *H04W 72/08* | (2009.01) |
| *H04W 74/08* | (2009.01) |
| *H04W 76/02* | (2009.01) |

(52) U.S. Cl.
CPC ........ *H04W 36/30* (2013.01); *H04W 36/0011* (2013.01); *H04W 48/20* (2013.01); *H04W 72/085* (2013.01); *H04W 74/0833* (2013.01); *H04W 76/028* (2013.01); *H04W 76/046* (2013.01)

(58) Field of Classification Search
CPC ..... H04W 36/30; H04W 36/18; H04W 36/12; H04W 64/00; H04W 4/02
USPC .......... 455/418–420, 436–453, 456.1–456.3, 455/509; 370/311, 328–334
See application file for complete search history.

(56) References Cited

U.S. PATENT DOCUMENTS

| | | |
|---|---|---|
| 7,747,275 B2 | 6/2010 | Funnell et al. |
| 2004/0203778 A1 | 10/2004 | Kuo et al. |

(Continued)

*Primary Examiner* — Dai A Phuong
(74) *Attorney, Agent, or Firm* — Meyertons Hood Kivlin Kowert & Goetzel, P.C.; Jeffrey C. Hood

(57) ABSTRACT

Performing cell re-selection by a device. A first cell on which to camp may be selected. The device may camp on the first cell in an idle-mode. The device may be configured to perform searches for neighboring cells according to an idle-mode timeline while camping on the first cell. The device may transmit a connection request to the first cell in order to transition the device from the idle-mode to a connected-mode via the first cell. One or more searches for neighboring cells may be performed according to a connected-mode timeline after transmitting the connection request, in response to transmitting the connection request. The one or more searches may be performed before the device establishes the connected-mode with the first cell.

20 Claims, 5 Drawing Sheets

(56) References Cited

U.S. PATENT DOCUMENTS

| | | | |
|---|---|---|---|
| 2005/0075074 A1* | 4/2005 | Benson | H04W 36/0088 455/67.11 |
| 2006/0199591 A1 | 9/2006 | Klatt | |
| 2007/0232302 A1* | 10/2007 | Aminov | H04W 36/36 455/433 |
| 2008/0056198 A1 | 3/2008 | Charpentier et al. | |
| 2008/0108346 A1 | 5/2008 | Umatt et al. | |
| 2009/0036123 A1 | 2/2009 | Jeon | |
| 2009/0227251 A1* | 9/2009 | Lei | H04J 11/0069 455/425 |
| 2010/0240356 A1* | 9/2010 | Lee | H04W 36/32 455/422.1 |
| 2010/0255843 A1 | 10/2010 | Huang et al. | |
| 2011/0105074 A1 | 5/2011 | Wu | |
| 2012/0083276 A1 | 4/2012 | Roberts et al. | |
| 2012/0108241 A1* | 5/2012 | Wu | H04W 24/10 455/436 |
| 2012/0155383 A1 | 6/2012 | Singh et al. | |
| 2012/0276945 A1 | 11/2012 | Chindapol et al. | |
| 2012/0302241 A1* | 11/2012 | Klingenbrunn | H04W 48/16 455/436 |
| 2012/0329462 A1 | 12/2012 | Pica et al. | |
| 2013/0196659 A1 | 8/2013 | Damji et al. | |
| 2013/0260811 A1 | 10/2013 | Rayavarapu | |
| 2013/0288729 A1* | 10/2013 | Islam | H04W 76/022 455/509 |
| 2014/0050129 A1* | 2/2014 | Magadi Rangaiah | H04W 48/20 370/280 |
| 2014/0086281 A1* | 3/2014 | Chang | H04B 1/7117 375/148 |
| 2014/0194125 A1 | 7/2014 | Wen et al. | |
| 2014/0273872 A1 | 9/2014 | Levy et al. | |
| 2014/0323180 A1 | 10/2014 | Uusitalo et al. | |
| 2015/0030001 A1* | 1/2015 | Koskinen | H04W 8/08 370/331 |
| 2015/0045031 A1* | 2/2015 | Kaikkonen | H04W 36/32 455/436 |
| 2015/0103718 A1 | 4/2015 | Kim et al. | |
| 2015/0195802 A1* | 7/2015 | Kim | H04W 76/048 370/336 |
| 2015/0334731 A1* | 11/2015 | Chen | H04W 36/0094 370/329 |

* cited by examiner

PERFORMING NEIGHBORING CELL SEARCHES WHILE TRANSITIONING TO CONNECTED-MODE

PRIORITY CLAIM

The present application is a continuation of U.S. patent application Ser. No. 13/761,746, entitled "Performing Neighboring Cell Searches While Transitioning to Connected-Mode", filed Feb. 7, 2013, which claims benefit of priority to U.S. Provisional Application No. 61/680,053 titled "Performing Neighboring Cell Searches While Transitioning to Connected-Mode" and filed on Aug. 6, 2012, whose inventors are Shivesh Makharia, Navid Damji, Longda Xing, and Johnson O Sebeni, and which are hereby incorporated by reference in their entirety as though fully and completely set forth herein.

FIELD

The present application relates to wireless devices, and more particularly to a system and method for performing cell re-selection procedures by a wireless device.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones. Users of such wireless devices may be able to move freely within a service territory of their service provider while using their wireless devices, and the wireless devices may operate in conjunction with the service provider's network in a manner that accounts for such movement.

For example, if a cellular phone is experiencing degraded signal strength or quality, a common cause is movement of the cell phone (e.g., a user of the cell phone may be carrying the cell phone while moving) which results in lower signal strength or quality from the serving cell as the user moves away from the serving cell's base station. As a result, some wireless communication technologies require that a wireless device search for alternative cells under certain conditions (e.g., detecting degraded signal strength or quality of the serving cell) and/or according to certain timelines.

However, performing such searches generally does consume power and decrease the battery life of the wireless device. As such, determining how such procedures should be performed under various circumstances, in light of device performance concerns and concerns regarding power consumption and battery life of the wireless device, is a difficult problem. Accordingly, improvements in wireless communication systems, and particularly in alternative cell search and re-selection policies and procedures, would be desirable.

SUMMARY OF THE INVENTION

In light of the foregoing and other concerns, it would be desirable to provide a way for wireless devices to perform cell-reselection procedures in a manner that appropriately balances power consumption and battery concerns with device performance.

Wireless devices which are capable of utilizing cellular communication may be designed to communicate with cells according to multiple modes of operation. For example, some wireless devices may be capable of operating in an idle mode or a connected mode. The idle mode may be used to conserve battery during substantially inactive periods, while at least periodically checking for messages or indications that a more active connection would be appropriate (e.g., paging messages). The connected mode may be used for active communication between a cell and a wireless device. Transitioning to connected mode from idle mode may commonly require certain procedures to be performed (e.g., transmitting messages between the wireless device and the serving cell to establish the connected-mode), which may take a certain amount of time.

It is common for wireless devices to perform cell re-selection related procedures differently depending on a mode of operation. While in connected mode, for example, cell re-selection related procedures may be performed relatively frequently, e.g., in order to provide optimal device performance. In contrast, while in idle mode, cell re-selection related procedures may be performed relatively infrequently, e.g., in order to conserve battery. In addition, it may be common for a waiting or guard period to be enforced after selecting a cell before cell re-selection related procedures may be performed, at least during idle mode operation.

Under highly mobile conditions, it is possible that immediately after a wireless device selects a cell on which to camp while in idle mode, there may be a neighboring cell with better signal strength/quality available. If the wireless device were to attempt to transition to connected-mode on the dying cell, the wireless device may likely fail to establish connected-mode, since the signal strength/quality of the serving cell may be rapidly falling off, and signals from one or more (potentially stronger) neighboring cells may be interfering with signals from the serving cell. Furthermore, if the wireless device continues to use the relatively infrequent cell re-selection procedures of idle-mode operation during the transition (e.g., since the wireless device may not technically have achieved connected-mode), there may be a significant delay before the wireless device can re-select to a new cell. For example, the delay may potentially include a post cell-selection waiting period and an additional waiting period until a next opportunity to perform a search for neighboring cells under the idle-mode timeline, in addition to the time required to actually perform the cell-reselection procedures. Such delays may negatively affect user experience by delaying the wireless device's connection to services (e.g., voice, data) via the wireless communication technology.

Thus, it may be desirable to provide a way for a wireless device to more aggressively perform cell re-selection related procedures during attempts to transition to connected-mode operation. Accordingly, embodiments are presented herein of such a method for a wireless user equipment (UE) device to perform cell re-selection related procedures and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present subject matter can be obtained when the following detailed description of the embodiments is considered in conjunction with the following drawings, in which.

Figure 1:
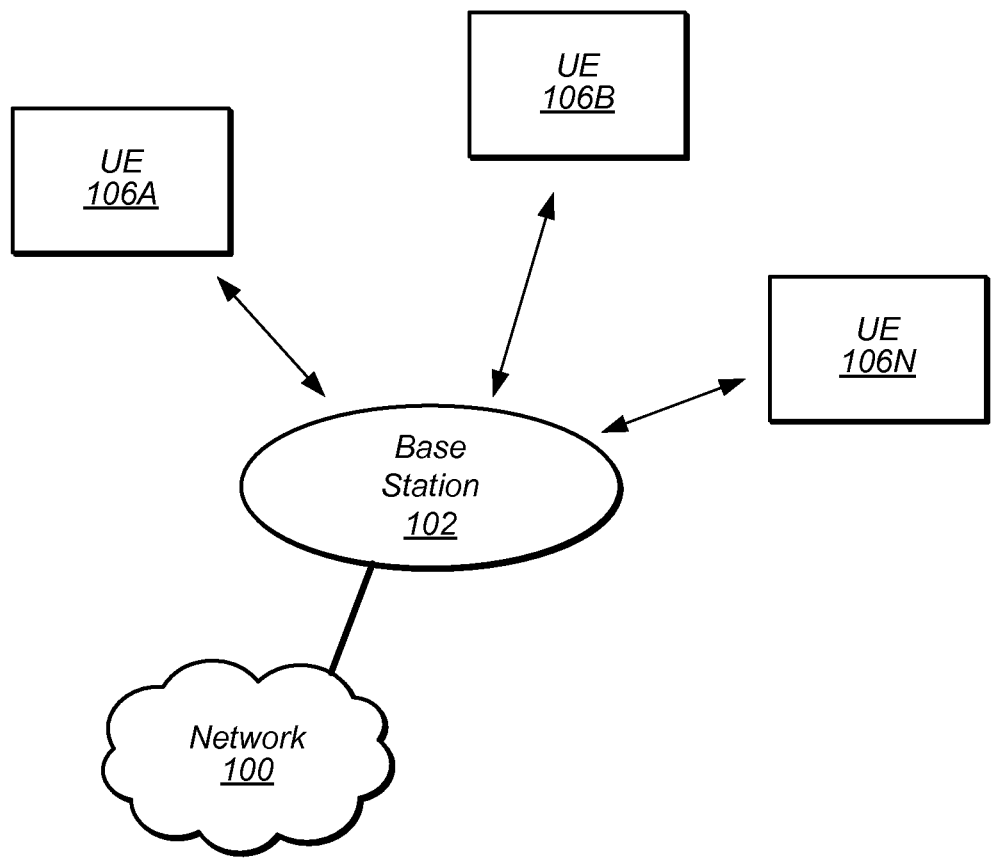
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in this disclosure:
UE: User Equipment
BS: Base Station
GSM: Global System for Mobile Communication
UMTS: Universal Mobile Telecommunication System
LTE: Long Term Evolution Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
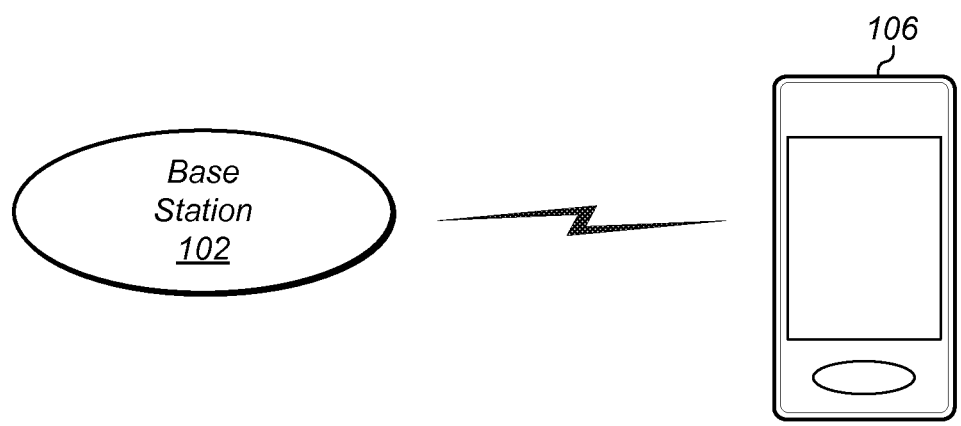
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and features of this disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

A UE 106 may be capable of communicating using multiple wireless communication standards. For example, a UE 106 might be configured to communicate using two or more of GSM, UMTS, CDMA2000, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of CDMA2000, LTE, LTE-A, WLAN, or GNSS. Other combinations of wireless communication technologies are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or CDMA2000 1×RTT, and separate radios for communicating using each of Wi-Fi and Bluetooth. Other configurations are also possible.

Figure 3:
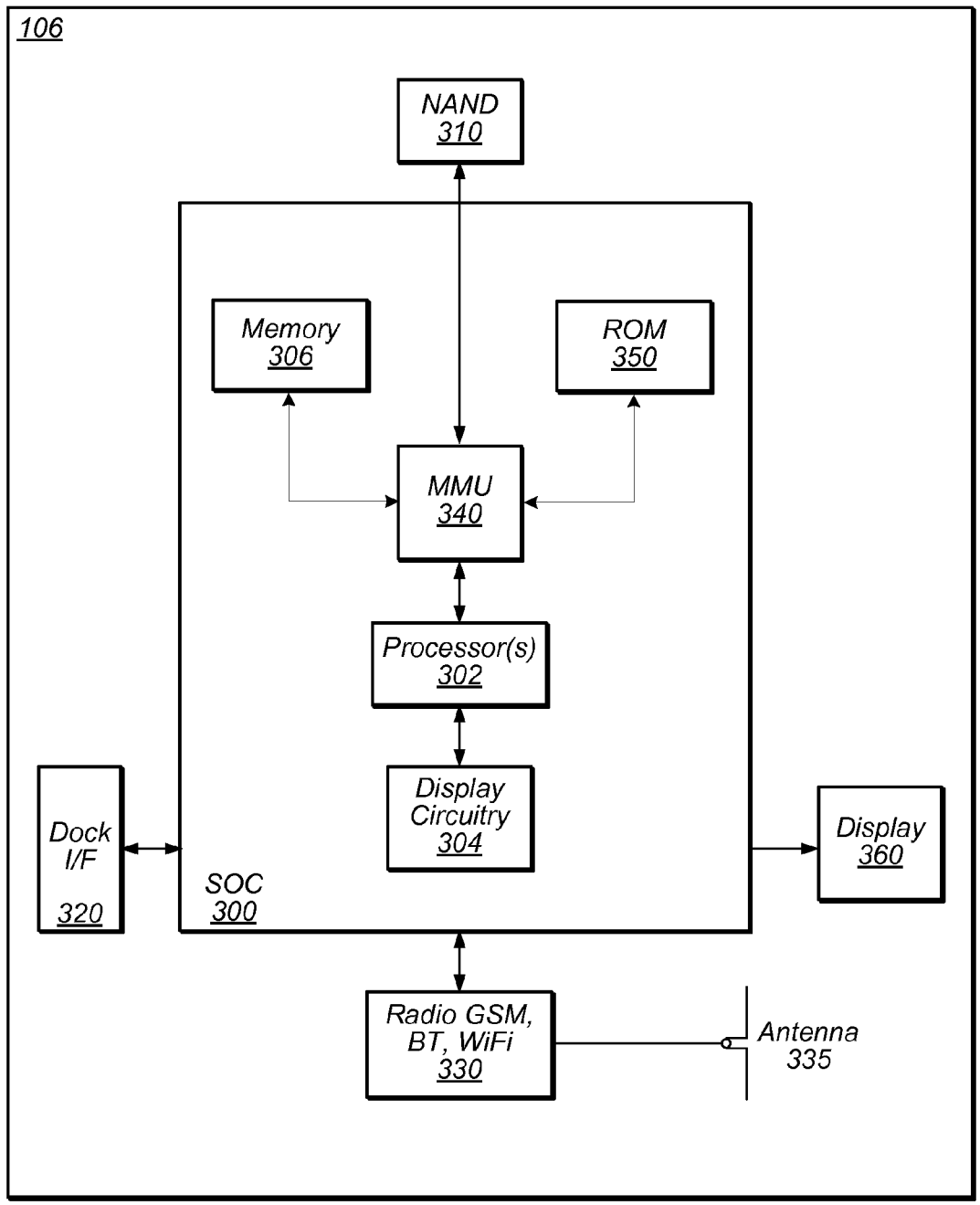
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for UMTS, LTE, CDMA2000, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing features for performing searches for neighboring cells and/or other cell re-selection procedures, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
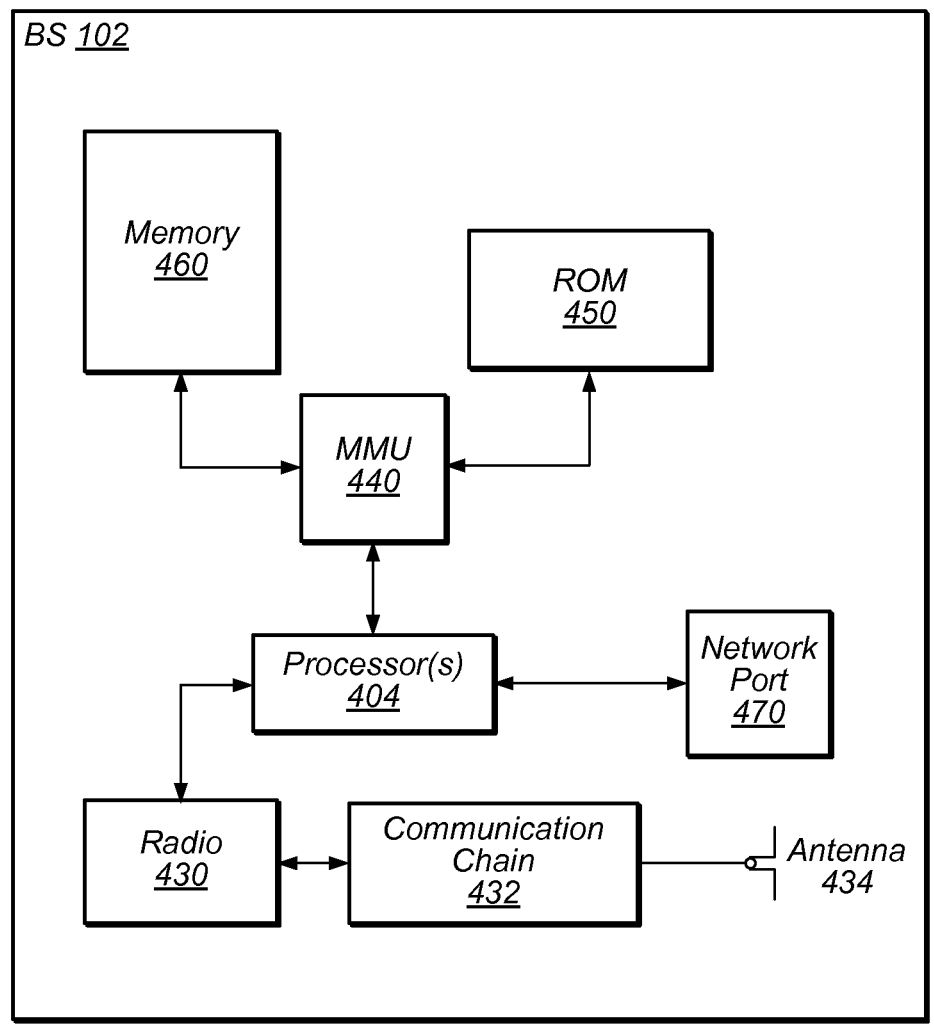
FIG. 4 illustrates an exemplary block diagram of a BS, according to one embodiment.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to communicatively couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, TDS-CDMA, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Figure 5:
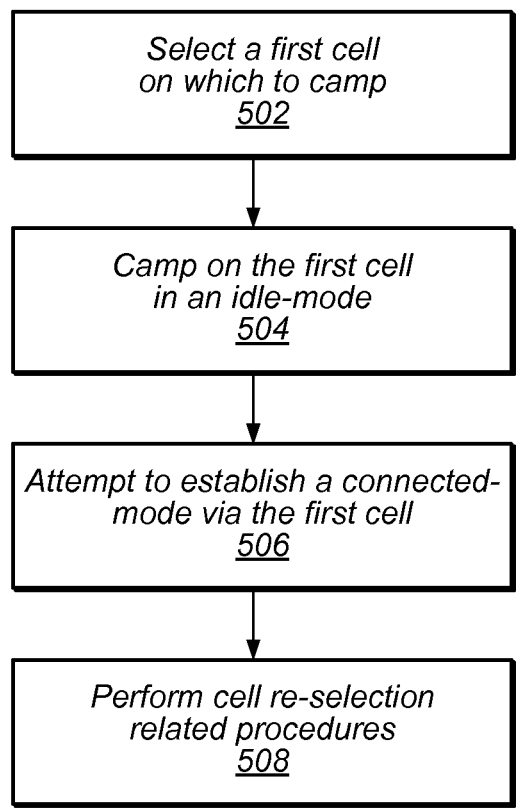
FIG. 5 is a flowchart diagram illustrating an exemplary method for a UE to perform cell re-selection.

FIG. 5 is a flowchart diagram illustrating a method for a wireless UE device 106 to perform cell re-selection. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, the UE 106 may select a first cell on which to camp. The first cell may operate according to a cellular technology such as GSM, UMTS, LTE, CDMA2000 (1×RTT, 1×EV-DO, etc.), etc. The first cell may accordingly be provided by a base station 102 and may provide a connection to a core network, e.g., of a cellular service provider. The base station 102 may operate in conjunction with numerous other base stations (which may provide other cells) and other network hardware and software to provide continuous (or nearly continuous) overlapping wireless service over a wide geographic area.

The first cell may be selected from among one or more cells within wireless communication range of the UE 106, which may be provided by nearby base stations. The UE 106 may be capable of discovering, detecting signals from, and possibly communicating with some or all of these neighboring cells, e.g., depending on signal strength/quality, permission, technological interoperability, etc. The first cell may be selected from the cells within wireless communication range of the UE 106 on the basis of one or more signal strength and/or signal quality measurements of the first cell and/or other nearby cells, among other possible criteria (e.g., wireless traffic congestion of the cell(s), operator of the cell(s), wireless technology according to which the cell(s) operate, etc.).

The first cell may be selected as an initial cell selection, e.g., upon powering on the UE 106 (or possibly after powering on a radio of the UE 106, e.g., upon exiting a limited-operation or "airplane mode"). Alternatively, the first cell may be selected as part of a cell re-selection procedure. For example, the UE 106 may perform a cell re-selection procedure to select a new cell (e.g., the first cell) with better signal strength and/or quality based on experiencing degraded signal strength and/or quality on a previous serving cell, e.g., as a result of moving from a service area of the previous serving cell to a service area of the first cell.

In 504, the UE 106 may camp on the first cell in an idle-mode. The first cell may serve the UE 106 and provide a connection (e.g., a passive connection, in the idle-mode) to the core network. For example, to camp on the first cell in the idle-mode the UE 106 may establish a radio resource control (RRC) entity, which may operate in an RRC-idle state while the UE 106 is in the idle-mode. The nature of idle-mode operation for a UE 106 may vary according to different wireless communication technologies. Generally, the idle-mode operation may be appropriate when a UE 106 is not actively exchanging data (e.g., as part of a call or a networking application such as a web browser) with the network. In some cases the idle-mode may include a discontinuous reception or "DRX" mode. In a DRX mode, a UE 106 may generally be inactive (e.g., with one or more components, such as radio and/or baseband components, powered down or sleeping) except for a window of activity during each DRX cycle. The active portion of a DRX cycle may be scheduled in a regular periodic manner; for example, many networks schedule the active portion of DRX cycles to occur at 1.28 s intervals, or at some multiple of 1.28 s (e.g., 2.56 s, 5.12 s, etc). Other values for DRX periodicity may be used as desired.

During the active portion of a DRX cycle, the UE 106 may perform certain actions (e.g., according to the configuration of the UE 106 and/or according to configuration information received from the network). For example, the UE 106 may monitor a paging channel for incoming voice calls or data, check for/update system configuration settings, and/or perform any of various other actions during the active portion of the DRX cycle.

In addition, the UE 106 may be configured to perform one or more cell re-selection related procedures, such as one or more cell measurements, during the active portion of the DRX cycle. For example, the UE 106 may measure one or more signal strength and/or signal quality metrics of the serving cell and/or one or more neighboring cells. According to one set of embodiments, for example, the UE 106 may be configured to utilize a "search threshold" value in conjunction with such measurements. If the signal strength and/or signal quality metrics are less than the search threshold (also referred to herein as a "first threshold") in a given DRX cycle, the UE 106 may perform a search for neighboring cells. Such a search may be justified if, as is common, the signal strength/quality decrease as a result of movement away from the serving cell and towards one or more other cells, in which case the search may discover one or more neighboring cells with stronger signal strength and/or better signal quality. Based on this, the UE 106 can determine if cell re-selection, e.g., to select another cell (e.g., a neighboring cell discovered in such a search) on which to camp, would be appropriate.

Note that according to some embodiments, the UE 106 may be configured to wait at least a first period of time after camping on the first cell before performing cell re-selection. The first period of time may be used as a "guard" period (or "guard interval", which may be enforced using a guard interval timer) to protect against re-selecting to a new cell immediately after camping on a cell, which could lead to a "ping-pong" effect of rapidly switching back-and-forth between two cells which have approximately equal strength at the UE 106. The length of the guard period may be defined according to a cellular standard according to which the UE 106 and the first cell operate, or may be selected as part of configuration of the UE 106 by a manufacturer of the UE 106, or an operator of the cellular network to which the first cell belongs, or any other such appropriate party. For example, according to one set of embodiments, the guard period may be defined by the LTE specification for devices and cells operating according to LTE as one second. In other embodiments, the length of the guard period may be any length of time, as desired.

In 506, the UE 106 may attempt to establish a connected-mode with the network via the first cell. In addition to the idle-mode of operation, the UE 106 may also be configured to communicate with the first cell according to a connected-mode (e.g., an RRC-connected state) of operation. Such a mode of operation may be used for data communication (e.g., continuous, nearly continuous, frequent, regular, or even sporadic) communications between the UE 106 and the first cell. For example, if a user of the UE 106 attempts to make an outgoing call using the UE 106, the UE 106 may attempt to establish a connected-mode connection with the network via the first cell in order to establish the call. Similarly, the UE 106 might attempt to establish connected-mode in response to an application executing on the UE 106 requesting a network connection or in response to a page received from the network during a DRX cycle in idle-mode (e.g., a notification of an incoming call or other connection request), or for any of various other reasons.

The attempt to establish the connected-mode may be made in any of various ways according to various embodiments. According to an exemplary LTE implementation, the attempt may include a random access channel (RACH) procedure, such as a connection request RACH. As will be recognized by those skilled in the art, a connection request RACH may be a contention-based technique for establishing connected-mode with the network via a serving cell (e.g., the first cell) according to the LTE standard. Other procedures for attempting to establish a connected-mode with a network may be used, e.g., according to other cellular standards (e.g., UMTS, GSM, CDMA 2000, etc.), as desired.

Note that according to some embodiments, it may be possible for the UE 106 to attempt to establish the connected-mode via the first cell immediately after camping on the first cell, or very shortly thereafter, such that the attempt is made prior to expiration of the first period of time (the guard period).

In 508, the UE 106 may perform cell re-selection related procedures. The cell re-selection related procedures may include any of a variety of procedures, potentially including one or more signal strength and/or signal quality measurements of the serving cell, searches for neighboring cells, and measurements of those neighboring cells. For example, according to one set of embodiments, the serving cell may be evaluated, such as by comparing signal strength and/or signal quality of the first cell with a pre-defined or configurable "search" threshold. If the serving cell is providing less than ideal service (e.g., if the comparison indicates that signal strength and/or signal quality of the first cell is less than the search threshold), this may be a trigger for initiating a search for neighboring cells. Such a search may include an intra-frequency search (e.g., searching for neighboring cells which operate in the same frequency band as the serving cell), and/or an inter-frequency search (e.g., searching for neighboring cells which operate in different frequency bands than the serving cell), according to various embodiments. Based on such a search (or searches) and measurements of any neighboring cells discovered in this way, the UE 106 may select a new cell to which to attach or camp on, e.g., if it is determined that the new cell may provide better service than the serving cell.

The signal strength and/or signal quality measurements may be any of various types of measurements: any of various metrics may be used for measuring signal strength and/or signal quality, as desired. For example, in some code division multiple access (CDMA) systems, such as WCDMA and CDMA2000, the metric Ec/Io may commonly be measured. In LTE, signal strength and signal quality metrics may include reference signal received power (RSRP) and reference signal received quality (RSRQ) respectively. Any of these metrics or other signal strength and/or signal quality metrics may be measured according to various embodiments, e.g., as appropriate for the wireless technology with respect to which the method is implemented.

As noted above, in some embodiments, in idle-mode the signal strength and/or signal quality of the first cell and/or neighboring cells may be measured in accordance with an idle DRX mode of operation of the UE 106. In this case, searches for and measurements of neighboring cell may be performed according to a first timeline, or an idle-mode timeline. For example, in the idle-mode, the UE 106 may only perform searches for neighboring cells during the active portion of a DRX cycle (e.g., during those times when the UE 106 wakes up to check for paging messages, or "paging occasions"). This may be a relatively infrequent timeline; for example, as noted above, DRX cycles may typically occur at 1.28 s intervals, among other possibilities.

In contrast, in connected-mode, the UE 106 may perform searches for and/or measurements of the serving cell and/or neighboring cells according to a connected-mode timeline. The connected-mode timeline for performing searches may be much more frequent than the idle-mode timeline; for example, according to one set of embodiments, such searches may be performed every 40 ms. Other frequencies, such as every 80 ms, 60 ms, or any other value, are also possible.

According to some embodiments, during a transition from idle-mode to connected-mode (e.g., during step 506 while the UE 106 is attempting to establish connected mode but has not yet established connected-mode via the first cell, such as after a connection request RACH has been transmitted), the UE 106 may perform searches according to the connected-mode timeline. Alternatively, the UE 106 may perform searches according to a different timeline than the connected-mode or idle-mode timelines, according to which search/measurement of the serving cell/neighboring cells is performed at least more frequently than according to the idle-mode timeline. In other words, the UE 106 may modify its neighboring cell search and measurement configuration upon attempting to transition from idle-mode to connected-mode.

Thus in some embodiments, in step 508, the cell re-selection related procedures may be performed according to a second timeline based on attempting to establish the connected-mode (e.g., transmitting a connection request message such as a connection request RACH) via the first cell. In particular, according to some embodiments, searches for and measurements of neighboring cells (and the serving cell) may be performed more frequently according to the second timeline than according to the first timeline; for example, the second timeline may be a connected-mode timeline. It may be desirable to initiate such cell re-selection related procedures more rapidly during a transition procedure (e.g., even before connected-mode is established) than while in idle-mode for a variety of reasons.

In particular, under highly mobile conditions, the UE 106 may be experiencing rapidly changing medium conditions; for example, signal strength/quality of the first (serving) cell might be degrading while signal strength/quality of one or more neighboring cells may be improving. If the UE 106 is in idle-mode, and active communication is not occurring, the delay in initiating cell re-selection related procedures (e.g., including searching for neighboring cells) caused by waiting until a next paging cycle may have a minimal or non-existent effect on user experience. However, as noted above, an attempt to transition to connected-mode may generally be caused by (or at least related to) an attempt to provide a user with a network-related application or service. If the first cell is failing (e.g., signal strength/quality is dropping off to unusable levels) while the UE 106 is attempting to establish a connected-mode connection via the first cell, the UE 106 may be unable to establish the connected-mode connection via the first cell, and establishment of a connected-mode (active) connection with the network may be delayed at least until the UE 106 is able to re-select to a new cell with acceptable signal strength/quality. If the UE 106 were to continue to use the idle-mode timeline in performing searches for/measurements of neighboring cells, this may thus cause a significant delay in the amount of time needed to establish a connected-mode connection, potentially resulting in delays to the application(s) or service(s) for which the connected-mode connection is being established and thereby negatively affecting user experience.

Furthermore, if the UE 106 attempts to establish connected-mode on a dying cell, the attempt(s) may fail. If a certain number (e.g., one, two, three, etc.) of attempts fail, the UE 106 may be subject to one or more penalties (e.g., data throttling, further delays to establishing connected-mode, etc.) by upper layer entities in the network. For example, in an exemplary LTE implementation, if a certain number of RACH connection requests by the UE 106 fail, one or more non-access stratum (NAS) entities in the network may subject the UE 106 to data throttling and/or one or more other penalties, which may further negatively affect user experience.

As noted above, it may be possible in some embodiments for the UE 106 to attempt to establish the connected-mode with the first cell immediately after camping on the first cell, or very shortly thereafter, such that the attempt is made prior to expiration of the first period of time (the guard period). As such, it may also be possible in some embodiments for the UE 106 to initiate cell re-selection related procedures prior to expiration of the first period of time. For example, the UE 106 may perform one or more measurements of signal strength and/or quality of the first cell, and one or more searches for and/or measurements of signal strength and/or quality of one or more neighboring cells, before the first period of time has expired, e.g., in response to attempting to establish the connected-mode connection with the first cell.

Note that, in contrast, at least according to some embodiments, according to the idle-mode timeline no cell re-selection related procedures (including searches for/measurements of neighboring cells) may be performed until the first period of time expires, even if a paging occasion occurs within the first period of time. However, in other embodiments, there may be no such requirement according to the idle-mode timeline.

According to some embodiments, once the UE 106 has performed a search/measurement of neighboring cells, the UE may still be required to wait for a second period of time (e.g., a second timer, which may also be referred to as a "cell re-selection timer") to expire before re-selecting to a new cell. The UE 106 may monitor one or more neighboring cells during this re-selection time period, and at the end of the second period of time (e.g., after expiration of the second timer), if the measurements over the second period of time indicate that re-selection to a new cell is appropriate (e.g., if the new cell has better signal strength and/or quality than the first cell), the UE 106 may re-select to the new ("second") cell. Note that according to one exemplary LTE implementation, the second period of time (also referred to as a "re-selection time" or "TResel") may be two seconds; however, the second period of time may alternatively be any length of time according to various LTE or other embodiments.

Once the UE 106 has re-selected to the second cell, the UE 106 may camp on the second cell and may initiate the RACH procedure on the second cell. Since the second cell may be stronger than the first cell, the UE 106 may be successful in establishing connected-mode with the network via the second cell. Alternatively, it is possible that the UE 106 may experience degraded signal conditions immediately after camping on the second cell and again perform cell re-selection according to the method of FIG. 5 e.g., under highly mobile conditions. In this case, the UE 106 may re-select to another new ("third") cell, initiate the RACH procedure via the third cell, and ideally successfully establish connected-mode with the network via the third cell.

Thus, by utilizing the method of FIG. 5 as provided above according to various embodiments, a UE 106 may perform cell re-selection related procedures such as neighboring cell searches and/or measurements according to a more rapid timeline than while in idle mode while transitioning to connected-mode, even before the UE 106 has actually established connected-mode. Advantageously, this may allow the UE 106 to more rapidly establish connected-mode with the network, particularly in highly mobile conditions in which attempts to establish connected-mode would be unsuccessful until re-selection to a new cell occurs. Thus, the method may significantly improve a user's experience with the UE 106 by decreasing the amount of time required for the UE 106 to connect to the network and receive desired network-related services, particularly in such highly mobile scenarios.

Figure 6:
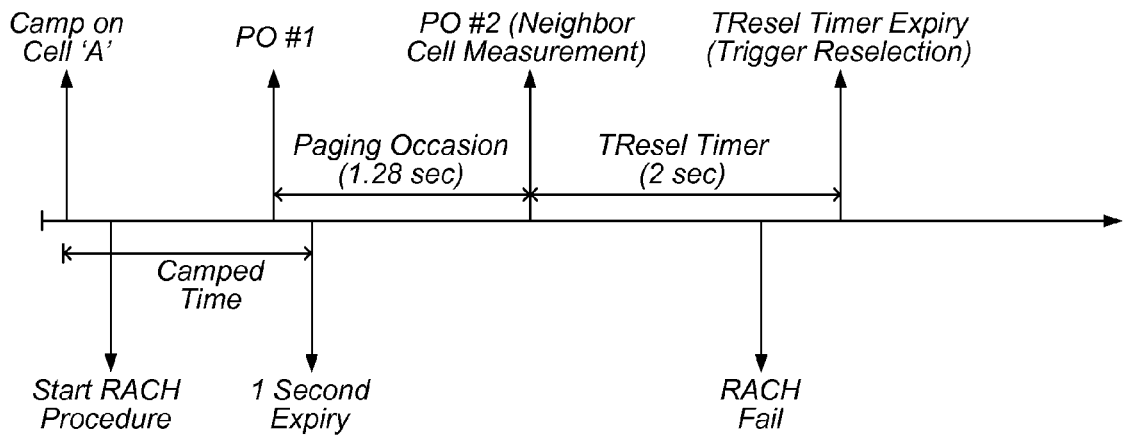
FIGS. 6-7 illustrate exemplary cell re-selection timelines according to various embodiments.
Figure 7:
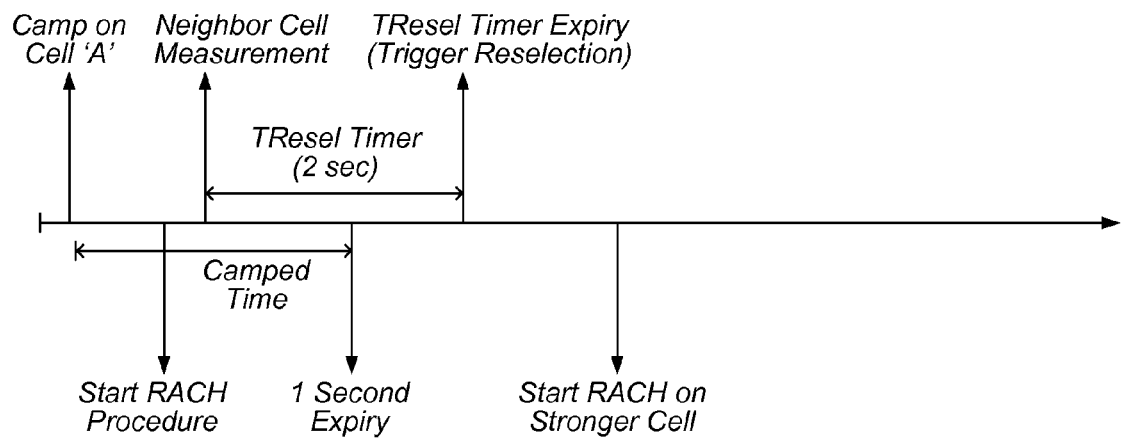

FIGS. 6-7—Exemplary Cell Re-Selection Timelines

FIGS. 6-7 illustrate possible timelines for cell re-selection after a UE 106 camps on a cell according to two exemplary embodiments of the method of FIG. 5. While numerous specific details of the exemplary set of embodiments of FIGS. 6-7 are provided hereinbelow by way of example, it will be recognized by those of skill in the art that any number of variations on or alternatives to the specific details of the exemplary embodiments of FIGS. 6-7 may be implemented if desired, and that accordingly the description provided with respect thereto should not be considered limiting to the disclosure as a whole.

In the exemplary set of embodiments of FIGS. 6-7, a UE 106 may be configured to communicate with base stations via the LTE wireless communication protocol. The base stations may provide a connection to an LTE core network, which may also be referred to as an evolved packet core (EPC), which may include any of a variety of network entities at various (e.g., higher and lower) layers of operation. Base stations that operate according to LTE may also be referred to herein as "eNodeBs" or "eNBs".

Note that according to both illustrated embodiments, it is assumed that the LTE system requires that the UE 106 wait at least one second after camping on a cell before re-selecting to a new cell, and also requires that the UE 106 utilize a reselection timer having a length of 2 seconds. It should be recognized, however, that other embodiments may use other time values for those parameters or may use other parameters altogether, as desired.

In both embodiments, the UE 106 may initially camp on a first cell ("cell A"), and may shortly thereafter start a RACH procedure. The RACH procedure may be configured to establish a connected-mode between the UE 106 and the LTE network. The RACH procedure may, for example, include transmitting a connection request RACH message to a base station providing the first cell.

Consider a situation, though, in which the UE 106 is experiencing highly mobile conditions. For example, a user of UE 106 may be driving or riding a train moving at a rapid speed. It is possible that immediately after selecting and camping on the first cell, the first cell may no longer be the strongest cell. For example, a neighboring cell, towards which the UE 106 may be moving, may be increasing in strength and causing interference on the first cell. As a result, the RACH procedure on the first cell will not be successful, and the UE 106 will not be able to establish the connected-mode until the UE 106 re-selects to a new (e.g., stronger) cell on which the RACH procedure may succeed.

According to the embodiment illustrated in FIG. 6, the UE 106 may utilize an idle-mode timeline in performing cell re-selection related procedures, even after beginning an attempt to transition to a connected mode. In contrast, according to the embodiment illustrated in FIG. 7, the UE 106 may initiate cell re-selection related procedures according to a much more rapid timeline after beginning an attempt to transition to a connected mode. Thus, generally, in the highly mobile conditions described above, operating according to the timeline illustrated in FIG. 7 may be advantageous for a UE 106.

More particularly, in the embodiment of FIG. 6, the UE 106 may perform searches/measurements of neighboring cells during paging occasions (e.g., the active part of DRX cycles). However, according to the embodiment of FIG. 6, if a paging occasion (e.g., the first paging occasion after camping) occurs within the one second guard interval, the UE 106 may not perform any search(es)/measurement(s) of neighboring cells during that paging occasion.

Thus in this case, initial search(es)/measurement(s) of neighboring cells may not occur until the second paging occasion. The re-selection timer (TResel) may initiate once those initial search(es)/measurement(s) of neighboring cells have been performed, and after expiration of the re-selection timer, if it is determined that re-selection to a neighboring cell is appropriate, the UE 106 may re-select to a new (e.g., stronger) cell.

Thus, as shown in FIG. 6, it is possible that re-selection (and thus the possibility of a successful RACH) may take as much as four seconds under this timeline. This may represent a significant delay in establishing connected-mode, and thus potentially in use of application(s) and/or service(s) which require connected-mode network connectivity for data exchange.

Furthermore, because of the delays resulting from the guard interval, the idle wake-up time (the interval(s) between paging occasions), and the re-selection timer, the RACH procedure may have failed, possibly multiple times, before re-selection to a new cell may occur in this embodiment. This may result in one or more penalties being imposed on the UE 106 by upper layer (e.g., NAS) network entities, such as bandwidth or data throttling and/or a delay penalty before the UE 106 is permitted to attempt to RACH again.

In contrast, in the embodiment of FIG. 7, the UE 106 may perform initial search(es)/measurement(s) of neighboring cells shortly after initiating the RACH procedure, which may be within (before expiration of) the one second guard interval. The reselection timer (TResel) may initiate once those initial search(es)/measurement(s) of neighboring cells have been performed, and after expiration of the reselection timer, if it is determined that re-selection to a neighboring cell is appropriate, the UE 106 may re-select to a new (e.g., stronger) cell.

Because of the overlap between the guard interval and the re-selection timer in the embodiment of FIG. 7, the time from camping on the first cell to re-selecting to a new cell may be significantly (e.g., as much as 1.5-2 s) less than in the embodiment of FIG. 6. In the exemplary highly mobile scenario described above in which there may be a better cell available immediately after the UE 106 joins the first cell, this may directly reduce the amount of time a user is required to wait before a requested service or application or call setup occurs. Furthermore, the reduced delay may prevent the UE 106 from incurring an additional upper-layer-imposed penalty as a result of failing a certain number of RACH requests, and may thus indirectly improve the quality of the user's experience with any applications, services, and/or calls using the connected-mode connection.

Note that it may be desirable to implement an accelerated neighbor search/measurement timeline after initiating a RACH procedure even if the RACH procedure is initiated after the guard interval has expired. For example, if the UE 106 were to use the same timeline for performing neighbor search/measurements when attempting to establish connected-more as when in idle-mode, the UE 106 could still be waiting over a second (e.g., depending on the length of the DRX cycle and when in the DRX cycle the RACH is initiated) before performing any neighbor search/measurements after initiating the RACH procedure. In contrast, if the UE 106 were to use a shorter timeline, such as the same timeline for performing neighbor search/measurements used when in connected-mode (e.g., every 40 ms, or every 80 ms, or at some other similar interval), neighbor search/measurements would be initiated much more rapidly (at least on average), which would again be advantageous, e.g., if the serving cell experiences signal strength/quality degradation in that time period, which might cause the RACH procedure to fail.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   device logic, wherein the device logic is configured to:
   select a first cell on which to camp, wherein the device logic is configured to wait a first period of time after selecting the first cell on which to camp before performing cell re-selection while camped on the first cell in an idle-mode;
   attempt to establish a connected-mode connection with a network via the first cell, wherein attempting to establish the connected-mode connection is performed prior to an end of the first period of time;
   perform one or more searches for neighboring cells prior to the end of the first period of time based on attempting to establish the connected-mode connection with the first cell.

2. The apparatus of claim 1, wherein the device logic is further configured to:
   modify a search and measurement configuration of the apparatus based on attempting to establish the connected-mode connection.

3. The apparatus of claim 1,
   wherein the one or more searches comprise one or more of an intra-frequency search and an inter-frequency search.

4. The apparatus of claim 1,
   wherein the device logic is configured to perform the one or more searches for neighboring cells prior to the end of the first period of time also based at least in part on experiencing mobile conditions.

5. The apparatus of claim 1, wherein the device logic is further configured to:
   select a second cell on which to camp based on performing the one or more searches for neighboring cells; and
   attempt to establish the connected-mode connection with the network via the second cell.

6. The apparatus of claim 1,
   wherein the device logic is further configured to wait at least a second period of time after performing the one or more searches for neighboring cells to select the second cell on which to camp.

7. An integrated circuit, comprising:
   a memory;
   cell selection circuitry configured to select a first cell on which to camp, wherein the cell selection circuitry is configured to wait a first period of time after selecting the first cell on which to camp before performing cell re-selection while camped on the first cell in an idle-mode;
   connection establishment circuitry configured to attempt to establish a connected-mode connection with a network via the first cell prior to an end of the first period of time; and
   search circuitry configured to perform one or more searches for neighboring cells prior to the end of the first period of time based on attempting to establish the connected-mode connection with the first cell.

8. The integrated circuit of claim 7,
wherein at least one of the cell selection circuitry, the connection establishment circuitry, and the search circuitry comprises a processor executing instructions stored on the memory.

9. The integrated circuit of claim 7,
wherein at least one of the cell selection circuitry, the connection establishment circuitry, and the search circuitry comprises a gate-array based hardware circuit.

10. The integrated circuit of claim 7,
wherein the cell selection circuitry is further configured to re-select to a second cell after expiration of the first period of time based on the one or more searches for neighboring cells,
wherein the connection establishment circuitry is further configured to attempt to establish the connected-mode connection with the network via the second cell after re-selection to the second cell.

11. The integrated circuit of claim 7,
wherein the cell selection circuitry is further configured to wait a second period of time after the one or more searches for neighboring cells are performed before performing cell re-selection.

12. The integrated circuit of claim 7,
wherein the attempt to establish a connected-mode connection comprises a performing a random access channel (RACH) procedure via the first cell.

13. The integrated circuit of claim 7,
wherein the search circuitry is configured to perform searches for neighboring cells according to a first search timeline in the idle-mode if the connection establishment circuitry is not attempting to establish a connected-mode connection,
wherein the search circuitry is configured to perform searches for neighboring cells according to a second search timeline in the idle-mode if the connection establishment circuitry is attempting to establish a connected-mode connection.

14. A system on chip (SOC), comprising:
a memory;
a processor; and
hardware logic;
wherein the SOC is configured to control wireless communication circuitry to:
camp on a first cell in an idle-mode;
initiate a first timer configured to prevent performing cell re-selection for a first period of time after camping on the first cell;
transmit a connection request to the first cell prior to expiration of the timer, wherein the connection request is configured to transition from the idle-mode to a connected-mode via the first cell;
perform one or more searches for neighboring cells prior to expiration of the timer based on transmitting the connection request to the first cell.

15. The SOC of claim 14, wherein the SOC is further configured to control wireless communication circuitry to:
initiate a second timer configured to prevent performing cell re-selection for a second period of time after performing the one or more searches for neighboring cells.

16. The SOC of claim 14, wherein the SOC is further configured to control wireless communication circuitry to:
evaluate signal strength and/or signal quality of the first cell;
determine that the signal strength and/or signal quality of the first cell is below a first threshold; and
perform the one or more searches for neighboring cells based at least in part on determining that the signal strength and/or signal quality of the first cell is below the first threshold.

17. The SOC of claim 14, wherein the SOC is further configured to control wireless communication circuitry to:
determine that a second cell has stronger signal strength and/or better signal quality than the first cell based on the one or more searches for neighboring cells; and
camp on the second cell after expiration of the first timer.

18. The SOC of claim 14, wherein the SOC is further configured to control wireless communication circuitry to:
perform neighbor search and measurement operations according to an idle-mode timeline while in the idle-mode if no connection request has been transmitted; and
perform neighbor search and measurement operations according to a connected-mode timeline if a connection request has been transmitted.

19. The SOC of claim 14,
wherein performing the one or more searches for neighboring cells comprises measuring one or more of signal strength or signal quality of one or more neighboring cells.

20. The SOC of claim 14,
wherein the connection request comprises a random access channel (RACH) connection request according to third generation partnership program (3GPP) long term evolution (LTE).

* * * * *